Patented June 12, 1951

2,556,863

UNITED STATES PATENT OFFICE 2,556,863

METHOD FOR SEALING FORMATIONS

Gilbert G. Wrightsman, Houston, Tex., assignor, by mesne assignments, to Standard Oil Development Company, Elizabeth, N. J., a corporation of Delaware No Drawing. Application June 10, 1946, Serial No. 675,841

3 Claims. (Cl. 166—22)

The present invention is directed to a method for sealing formations and particularly subsurface formations penetrated by a borehole.

It is often desirable to treat formations in order to seal them against the flow of fluid therethrough. For example, in the production of petroleum from wells, the bore of the well usually penetrates water-producing formations as well as the petroleum producing formations and it is frequently desirable to treat a water-producing formation to prevent further flow of water from the formation into the borehole.

It is an object of the present invention to devise a method for sealing formations or greatly decreasing the permeability thereof in a simple, effective manner.

In accordance with the present invention, a solution comprising a mixture of water and organic liquid capable of hydrolyzing when exposed to the temperature of the formation being treated therein, and a solute soluble in the solvent and substantially insoluble in the hydrolyzed solvent, is forced into a formation which is to be sealed and retained quiescent in the formation to allow the solvent to hydrolyze and precipitate at least the major portion of the solute to seal the formation.

In practicing the method of the present invention, the solute selected must have the characteristics of being stable and solid at the temperature of the formation to be treated. It is additionally necessary that the solute be insoluble in water. In the usual plugging operations, it may be desirable to employ a solute insoluble in oil as well as water but where there is a danger of plugging an oil producing formation a solute may be insoluble in water but soluble in oil whereby if the solution is inadvertently placed in an oil producing formation it may be removed by producing the oil-bearing formation to dissolve out the plugging agent.

The solute employed in the practice of the present invention is diphenyl-thiourea.

The solvent employed in forming the solution must be subject to hydrolysis at the temperature of the formation to be treated. The decomposition products resulting from the hydrolysis must be relatively poor solvents for the solute selected. It will be understood that in order to carry out the hydrolysis step, the solvent must be in contact with water; with many solvents it may be desirable to employ an agent, such as an alkali or acid, which promotes the hydrolysis or decomposition of the solvent. In any event, the decomposition products must be poor solvents for the solute.

It will be understood that in the treatment of formations a substantial distance below the surface of the earth, there must be a time interval after the reaction begins before a precipitate forms; such a time interval is necessary in order to allow the solution to be placed satisfactorily in the formation to be treated. The following are given as examples of liquids which are suitable as solvents for forming the solution employed in the practice of the present invention. These materials may be hydrolyzed at the temperatures commonly encountered in subsurface formations to give reaction products which are less effective solvents for solutes to be used as plugging agents for subsurface formations:

Group I—Alkyl esters

Acetates, formates and propionates are suitable for use with alkyl groups, such as methyl, ethyl, propyl and isopropyl. Specific examples of this group are ethyl acetate, ethyl formate, ethyl propionate, methyl acetate and isopropyl acetate.

Group II—Alkyl nitrates

Examples of this group are methyl nitrate and ethyl nitrate.

Group III—Alkyl nitriles

Examples of this group are methyl cyanide and ethyl cyanide.

Group IV—Acyl halides

Examples of this group are acetyl chloride, ethanyl chloride and propionyl chloride.

Group V—Aryl halides

Examples of this group are benzoyl chloride and salicyl chloride.

In forming the solvent as above described in which the solute is capable of undergoing hydrolysis to precipitate the solute, the solutes may be present in the initial solution in a concentration ranging from 5% to 100% saturation. However, it will usually be desirable to employ a solution of maximum concentration in order to form a maximum amount of the precipitate in the formation being treated.

In order to illustrate further the practice of the present invention, the following example is given.

Example

A solution was made up consisting of 25 cc. of ethyl acetate, 1.5 cc. of 50% denatured alcohol and 1.25 cc. of concentrated ammonium hydroxide. This solution was saturated with diphenyl-thiourea. The resultant solution had present therein diphenyl-thiourea in an amount approximately 25% by weight of the solvent. The solution was divided into a first aliquot of 15 cc. and the second aliquot of 10 cc. The first aliquot was placed in a sand of 100-200 mesh held in a glass tube and the second aliquot was placed in a test tube and then both preparations were submerged in a water bath and maintained at 115° F. for 24 hours. At the end of this period the relative permeability of the sand in the glass tube was 10% of the original permeability, while a voluminous precipitate had formed in the test tube and was found to be approximately ⅓ of the diphenol-thiourea present in the original mixture.

While I have disclosed specific examples of suitable materials to be employed in forming the solution, it will be evident to a workman skilled in the art that various other materials are available to be used as the solute and solvent in practicing the method of the present invention and it is my intention to embrace such procedures by the hereto appended claims.

I claim:

1. A method for treating a formation comprising the steps of dissolving diphenyl-thiourea in a solvent capable of hydrolyzing at the temperature of said formation to form reaction products in which diphenyl-thiourea is less soluble than in the solvent, forcing a solution comprising said diphenyl-thiourea and solvent into the formation to be treated and there maintaining said solvent in contact with water to cause hydrolysis of the solvent and precipitation of the diphenyl-thiourea and maintaining the solution within the formation until substantial amounts of the diphenyl-thiourea are precipitated therein to reduce substantially the permeability of the formation.

2. A method for treating a formation comprising the steps of forming a solution including diphenyl-thiourea, an ester capable of hydrolyzing at the temperature of said formation to form reaction products in which diphenyl-thiourea is less soluble than in said ester, and water for hydrolyzing the ester, forcing the solution into the formation to be treated and maintaining it quiescent in said formation to allow hydrolysis of the ester and precipitation of the diphenyl-thiourea whereby the original permeability of the formation is substantially reduced.

3. A method for treating a subsurface formation comprising the steps of forming a solution comprising ethyl acetate, alcohol, water and a minor portion of ammonium hydroxide having di-phenyl-thiourea dissolved therein forcing the solution into a selected formation and maintaining it quiescent therein until hydrolysis of the solvent takes place to precipitate a substantial portion of the di-phenyl-thiourea in the formation.

GILBERT G. WRIGHTSMAN.

REFERENCES CITED

The following references are of record in the file of this patent:

UNITED STATES PATENTS

| Number | Name | Date |
|---|---|---|
| 2,016,118 | Muskat | Oct. 1, 1935 |
| 2,265,962 | Bent et al. | Dec. 9, 1941 |